No. 817,627. PATENTED APR. 10, 1906.
J. CROSSIN.
HOG TROUGH.
APPLICATION FILED JUNE 30, 1905.
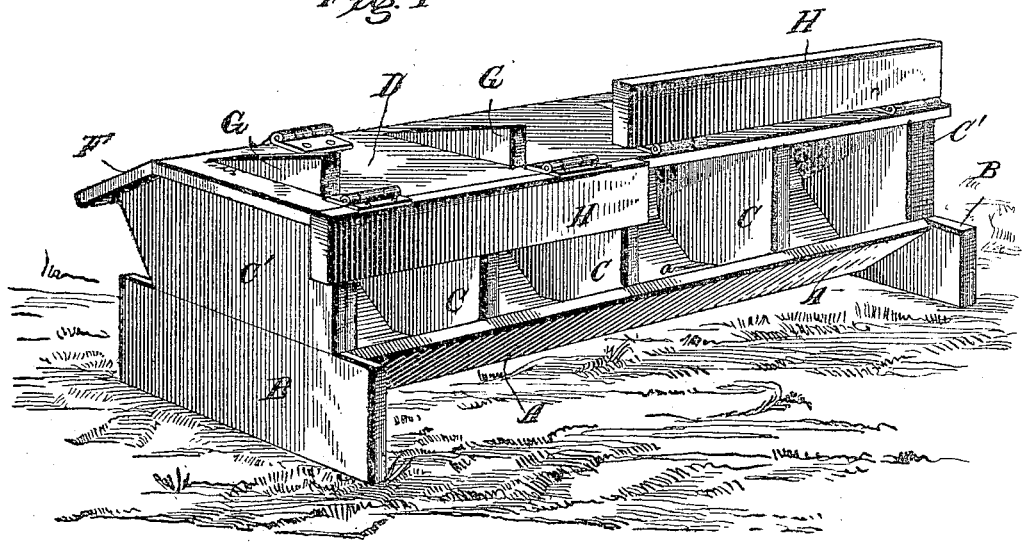
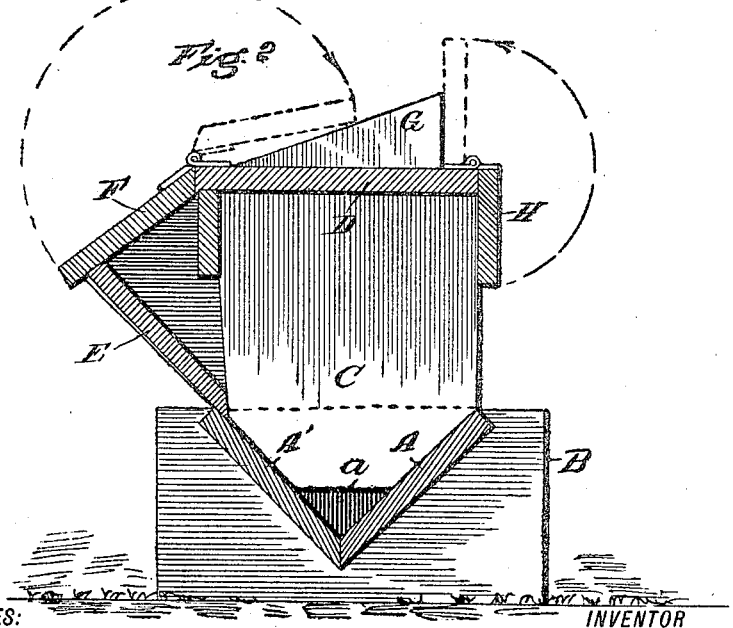
WITNESSES:
C. E. Duffey
Edw. W. Byrn.
INVENTOR
JOHN CROSSIN
BY Munn & Co.
ATTORNEYS

UNITED STATES PATENT OFFICE.

JOHN CROSSIN, OF AVA, ILLINOIS.

HOG-TROUGH.

No. 817,627.  Specification of Letters Patent.  Patented April 10, 1906.

Application filed June 30, 1905. Serial No. 267,738.

*To all whom it may concern:*

Be it known that I, JOHN CROSSIN, a citizen of the United States, residing at Ava, in the county of Jackson and State of Illinois, have invented a new and useful Improvement in Hog-Troughs, of which the following is a specification.

My invention is in the nature of a new water and feed trough for hogs.

My object is to economize time and labor in feeding hogs and also to prevent waste of feed and to prevent the animals from getting their feet into the trough and fouling the feed, also to prevent hogs from getting in the way while the feeder is feeding, also to arrange it so that each animal gets its share of feed by preventing them from fighting each other away.

A further object is to provide feeding places for small hogs which cannot be taken away from them by the larger and stronger ones and also to provide means for keeping rain, snow, and ice out of the trough.

My invention relates to that form of trough which is formed with separate feeding-compartments provided with doors; and it consists in the novel construction and arrangement of parts, which I will now proceed to describe with reference to the drawings, in which—

Figure 1 is a perspective view from the side of the trough on which the hogs feed, and Fig. 2 is a vertical transverse section.

In the drawings, A A' are two boards secured together to form a V-shaped trough having end pieces B B for closing the ends and supporting the trough, this being a common and well-known construction.

C represents vertical partitions erected at suitable intervals along the trough to form compartments large enough to admit the head of any ordinary hog. These partitions do not extend quite to the bottom of the trough, but leave a small space for intercommunication at the bottom, as seen at *a*, so as to permit liquid food to run under the partitions. The partitions C extend some distance above the trough-boards A A', and the corresponding ends C' are made of double thickness, and upon these and all the partitions C is laid a flat horizontal board D, which forms a roof to the trough.

The ends C' C' are extended laterally on one side to connect with an inclined chute-board E, which runs the full length of the trough and discharges into the latter, and into which chute the feeder pours the liquid food which runs down into the trough and is distributed along the same into its several compartments. The upper opening to this chute is provided with a cover F, hinged to the roof and arranged to rest in inclined position on the chute-board and end pieces when the said cover is closed.

On top of the roof in transverse position is a series of triangular brackets G. The longer faces of these brackets form a rest for the cover F when it is open, and the shorter vertical faces of these brackets are set back a little distance from the edge of the roof, so as to give room for hinged doors H, which are arranged along that side of the feed-trough. These doors are so hinged that when open they will stand against the ends of the brackets G and leave the feeding-compartments wholly open and unobstructed, as seen on the right of Fig. 1, but when folded down, as seen on the left, they reduce the size of the openings of the compartments to such dimensions that only a small hog can pass his head into these partially-obstructed compartments. This prevents a large hog from robbing a small hog of his compartment, for if the large hog fights the small hog away the large hog can make no use of that compartment. This insures that the small and weaker hogs get their full share of food and are thus enabled to thrive.

One advantage of my invention is that the parts above the trough A A' and ends B are applicable to any of the usual V-shaped troughs already in use.

Having thus described my invention, what I claim as new, and desire to secure by Letters Patent, is—

1. A feed-trough having a series of compartments and doors hinged at their upper ends to the upper parts of said compartments and arranged to fold down in front of said compartments to obstruct the upper part of the openings into the same.

2. A feed-trough comprising a longitudinal receptacle, vertical partitions in the same extending above said receptacle and corresponding end pieces, a horizontal roof arranged above the partitions, transverse triangular brackets on the roof, a laterally-projecting chute with hinged cover on one side and doors hinged upon the other side of the roof and arranged to fold down over and obstruct the upper portions of the feed-compartments.

JOHN CROSSIN.

Witnesses:
 BERTHA E. EVERTS,
 HENRY MODGLIN.